(12) United States Patent
Swearingen et al.

(10) Patent No.: US 10,982,528 B2
(45) Date of Patent: *Apr. 20, 2021

(54) STRING OF REACTANT CHAMBERS AND A PROCESS THEREOF

(71) Applicant: SPECIALTY EARTH SCIENCES, LLC, New Albany, IN (US)

(72) Inventors: Lindsay Swearingen, Floyds Knobs, IN (US); Jason Swearingen, Floyds Knobs, IN (US)

(73) Assignee: Specialty Earth Sciences, LLC, New Albany, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,083

(22) Filed: Mar. 28, 2018

(65) Prior Publication Data

US 2018/0214918 A1 Aug. 2, 2018

Related U.S. Application Data

(63) Continuation of application No. 15/014,308, filed on Feb. 3, 2016, now Pat. No. 9,943,893.

(51) Int. Cl.
| | |
|---|---|
| E21B 47/01 | (2012.01) |
| B09C 1/08 | (2006.01) |
| B09C 1/10 | (2006.01) |
| B09C 1/00 | (2006.01) |
| C02F 1/68 | (2006.01) |
| C02F 103/06 | (2006.01) |
| E21B 7/04 | (2006.01) |

(52) U.S. Cl.
CPC .............. *E21B 47/01* (2013.01); *B09C 1/002* (2013.01); *B09C 1/08* (2013.01); *B09C 1/10* (2013.01); *C02F 1/688* (2013.01); *B09C 2101/00* (2013.01); *C02F 2103/06* (2013.01); *E21B 7/046* (2013.01)

(58) Field of Classification Search
CPC . E21B 7/046; E21B 47/01; B09C 1/08; B09C 1/10; B09C 1/002; B09C 101/00
See application file for complete search history.

(56) References Cited

U.S. PATENT DOCUMENTS

| | | | | |
|---|---|---|---|---|
| 5,403,491 | A * | 4/1995 | Holland | ................ B09C 1/00 |
| | | | | 210/680 |
| 9,943,893 | B2* | 4/2018 | Swearingen | ............. B09C 1/08 |
| 2012/0222500 | A1* | 9/2012 | Riess | ...................... G01N 1/02 |
| | | | | 73/863.23 |

* cited by examiner

*Primary Examiner* — Brad Harcourt
(74) *Attorney, Agent, or Firm* — Steve Witters; Witters & Associates

(57) ABSTRACT

A string of reactant chambers configured for inserting a reactant into each reactant chamber, in the string of reactant chambers, while maintaining the reactant chamber being filled in the string of reactant chambers is provided. The string of reactant chambers has a first reactant chamber, a second reactant chamber, and a system configured to maintain the reactant chamber being filled in the string of reactant chambers. The system has a first removable end cap on each reactant chamber and a coupler on each reactant chamber configured for the removal of the first removable end cap and maintaining the reactant chamber in the string of reactant chambers. A process for charging a reactant chamber is also presently disclosed.

17 Claims, 7 Drawing Sheets

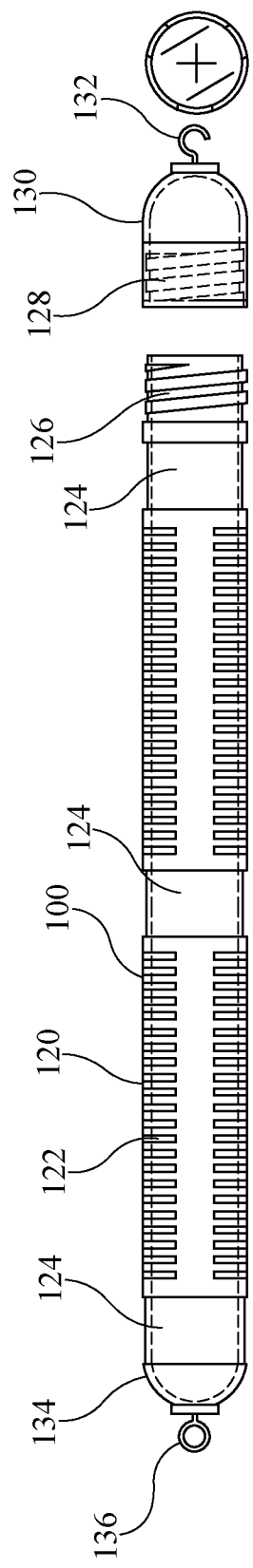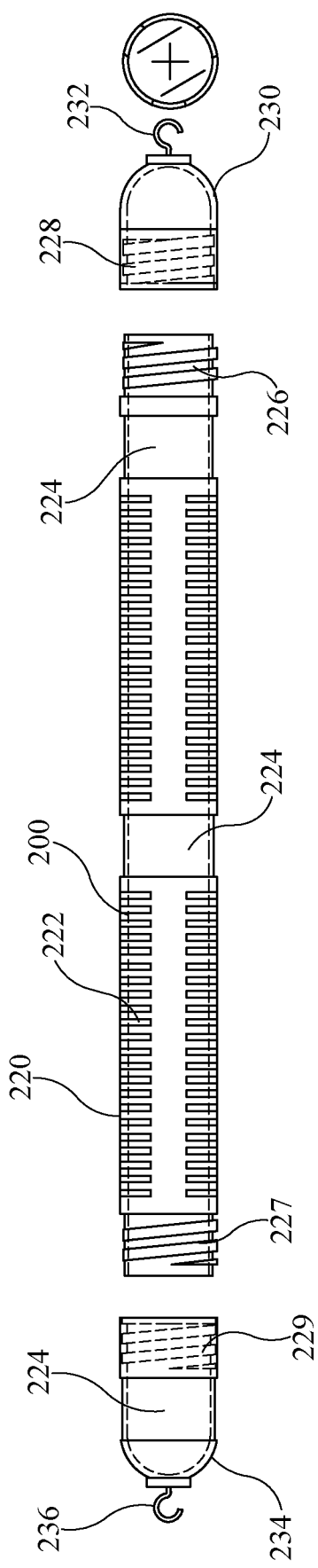
FIG. 2a
FIG. 2b

STRING OF REACTANT CHAMBERS AND A PROCESS THEREOF

CROSS REFERENCE TO RELATED APPLICATIONS

This application is a Continuation Application of U.S. patent application Ser. No. 15/014,308 filed Feb. 3, 2016, the entire content of which is incorporated herein by reference.

FIELD OF INVENTION

The present invention relates to reactant chambers and methods for insitu treatment of soil or groundwater.

BACKGROUND OF THE INVENTION

Discharges of hazardous organic compounds into the environment have led to contamination of surface water, soil, and aquifers resulting in potential public health problems and degradation of the land for future use. As used in this specification and appended claims, hazardous organic compound means a chemical or substance that is either toxic or highly toxic, an irritant, corrosive, a strong oxidizer, a strong reducer, a strong sensitizer, combustible, either flammable or extremely flammable, dangerously reactive, pyrophoric, pressure-generating, a compressed gas, a carcinogen, a teratogen, a mutagen, a reproductive toxic agent, or is suspected of having adverse health effects on humans. In many cases, subsurface groundwater contaminant plumes may extend hundreds to thousands of feet from the source area of a chemical release resulting in extensive contamination. These chemical contaminants may then be transported into drinking water sources, lakes, rivers, and even basements of homes.

The U.S. Environmental Protection Agency (USEPA) has established maximum concentration limits (MCL's) for various hazardous organic and inorganic compounds in water and soils. For instance, stringent drinking water limits placed on many solvent organic compounds in water can be as low as 0.005 mg/L (parts per billion).

The presence of hazardous compounds in subsurface soils, surface water, and groundwater is a well-documented and extensive problem. The source of these hazardous materials is often times from industry where the materials are released onto the soil surface or surface water or even into the subsurface soil and/or groundwater through leaking storage tanks. Many, if not most, of these compounds are capable of moving through the soil under the influence of moving water, gravity, or capillary action and serve as a source of groundwater contamination. As used in this specification and appended claims, soil is to be interpreted broadly to include all naturally occurring material found below ground surface (e.g. silts, clays, sands, rock, karsts, organics, tills, etc.).

Soil, surface water, groundwater, and wastewater can become contaminated by a variety of substances. The substances include, without limitation, metals, volatile, semi-volatile, and non-volatile organic compounds. Common examples of such contaminates include arsenic, barium, cadmium, chromium, lead, mercury, selenium, silver, PCBs, gasoline, oils, wood preservative wastes, and other hazardous organic compounds. Such other hazardous organic compounds may include, but not limited to, dioxane (such as 1,4-dioxane), chlorinated solvents (such as trichloroethylene (TCE), vinyl chloride, tetrachloroethylene (PCE), and dichloroethanes), ethylene dibromide, halobenzenes, polychlorinated biphenyls, acetone, tert-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc).

Contaminated groundwater and/or soil often must be removed or treated to make it less toxic and to meet federal and state regulatory requirements. There are a variety of reactants, biological remediation enhancing materials, and methods for treating contaminated soil, surface water, groundwater, and wastewater as discussed below.

Peroxydisulfate's have been reported as applied constituents for organic carbon digestion or decomposition. Application methods include thermally activated persulfate oxidation in conjunction with an electro-osmosis system to heat and transport persulfate anions into soils. Permanganate(s) and peroxygen(s) reactant(s) have also been reported as applied constituents for oxidation of organic compounds. Peroxygen compound(s) applied independently or in conjunction with a metallic salt catalyst(s) (complexed and not complexed; chelated and not chelated) have been shown to break down organic compounds within the soil, groundwater, and wastewater. Sorbent materials, such as activated carbon, have been used in situ to trap contaminants present in the soil and groundwater and to prevent further migration of contaminant plumes. Additionally, biological remediation can be supported and/or enhanced by in situ application of materials such as zero valent iron (ZVI), oxides, nitrates, oxygen releasing compounds, and organic substrates such as molasses, high fructose corn syrup, hydrogen releasing compounds, vegetable oils and emulsions, sodium lactate, lactic acid, sodium benzoate, proprionate, butyrate, chitin, mulch and compost, whey, and humic acids.

Groundwater and subsurface soil have been treated by injecting biological remediation enhancing materials, sorbent materials, or reactant(s) (with or without a catalyst(s)), within an aqueous mixture, slurry, or suspension into the subsurface. Another method for in situ treatment of groundwater includes the excavation of a trench proximate or downstream of a plume of contaminant(s). The trench is filled with biological remediation enhancing materials, sorbent materials, or reactant(s) and a permeable media(s) (i.e. sand) for the plume to flow through and the reactant(s) react with contaminant(s). These trenches filled with biological remediation enhancing materials, sorbent materials, or reactants are often referred to as permeable reactive barriers (PRBs). Limiting factors or disadvantages of these methods may include a) recovery of spent reactants, sorbent materials, or biological remediation enhancing materials, b) recharging the treatment system with biological remediation enhancing materials, sorbent materials, or unreacted reactant, c) obstructions such structures, roads, subsurface utilities, or other improvements to the land above or proximate the area of contamination.

Because of these limitations or disadvantages of the art before, there is a need for improved systems and methods of insitu treatment of groundwater and/or soil.

SUMMARY OF THE INVENTION

One aspect of the present disclosure provides a string of reactant chambers configured to be placed into and withdrawn from a well. The string of reactant chambers has a first and a second reactant chamber, each of the reactant chambers being configured to hold a reactant therein. Each reactant chamber comprising a flow through sidewall with a first axial end and a second axial end. A first end cap is on the first axial end and a second end cap is on the second axial end. A first coupler extends from the first end cap and a second coupler extends from the second end cap. The first coupler is configured to couple and uncouple with the second coupler. The first coupler and the second coupler are configured for a 360° pivot of the first reactant chamber with respect to the second reactant chamber, configuring the coupled string of reactant chambers to be placed into and withdrawn from a curved well. The first end cap on the first reactant chamber is configured to be removed from the first flow through sidewall, upon the first coupler on the first reactant chamber being uncoupled from the second coupler on the second reactant chamber. The string of reactant chambers are configured to remain in a joined string upon uncoupling and removal of the first end cap from the first flow through sidewall.

Another aspect of the present disclosure provides a string of reactant chambers configured for inserting a reactant into each reactant chamber, in the string of reactant chambers, while maintaining the reactant chamber being filled in the string of reactant chambers. The string of reactant chambers comprises a first reactant chamber, a second reactant chamber, and a system configured to maintain the reactant chamber being filled in the string of reactant chambers. The system comprises a first removable end cap on each reactant chamber and a coupler on each reactant chamber. Each coupler is configured to couple each reactant chamber together in a first and a second coupled configuration. Each coupler being configured for a 360° pivot of the first reactant chamber with respect to the second reactant chamber, when the first and second reactant chambers are in the first or second coupled configuration. Each coupler being configured for the removal of the first removable end cap when the first and second reactant chambers are in the second coupled configuration.

A further aspect of the present disclosure provides a process for charging a reactant chamber, in a string comprising a plurality of reactant chambers. The process comprises the steps of: a) uncoupling an end cap on a first reactant chamber from an adjacent reactant chamber, in the string of reactant chambers; b) removing the uncoupled end cap from the first reactant chamber and forming an opening in the first reactant chamber; c) charging the first reactant chamber by inserting a reactant into the formed opening; d) replacing the removed end cap back onto the first reactant chamber; e) coupling the first reactant chamber to the adjacent reactant chamber, in the string of reactant chambers; and f) maintaining the first reactant chamber in the string of reactant chambers while performing steps a)-e).

BRIEF DESCRIPTION OF THE DRAWINGS

FIG. 2*a* shows an exploded view of a reactant chamber of the present disclosure;

FIG. 2*b* shows an exploded view of an alternative embodiment of the reactant chamber of the present disclosure;

DETAILED DESCRIPTION OF THE INVENTION

Figure 1:
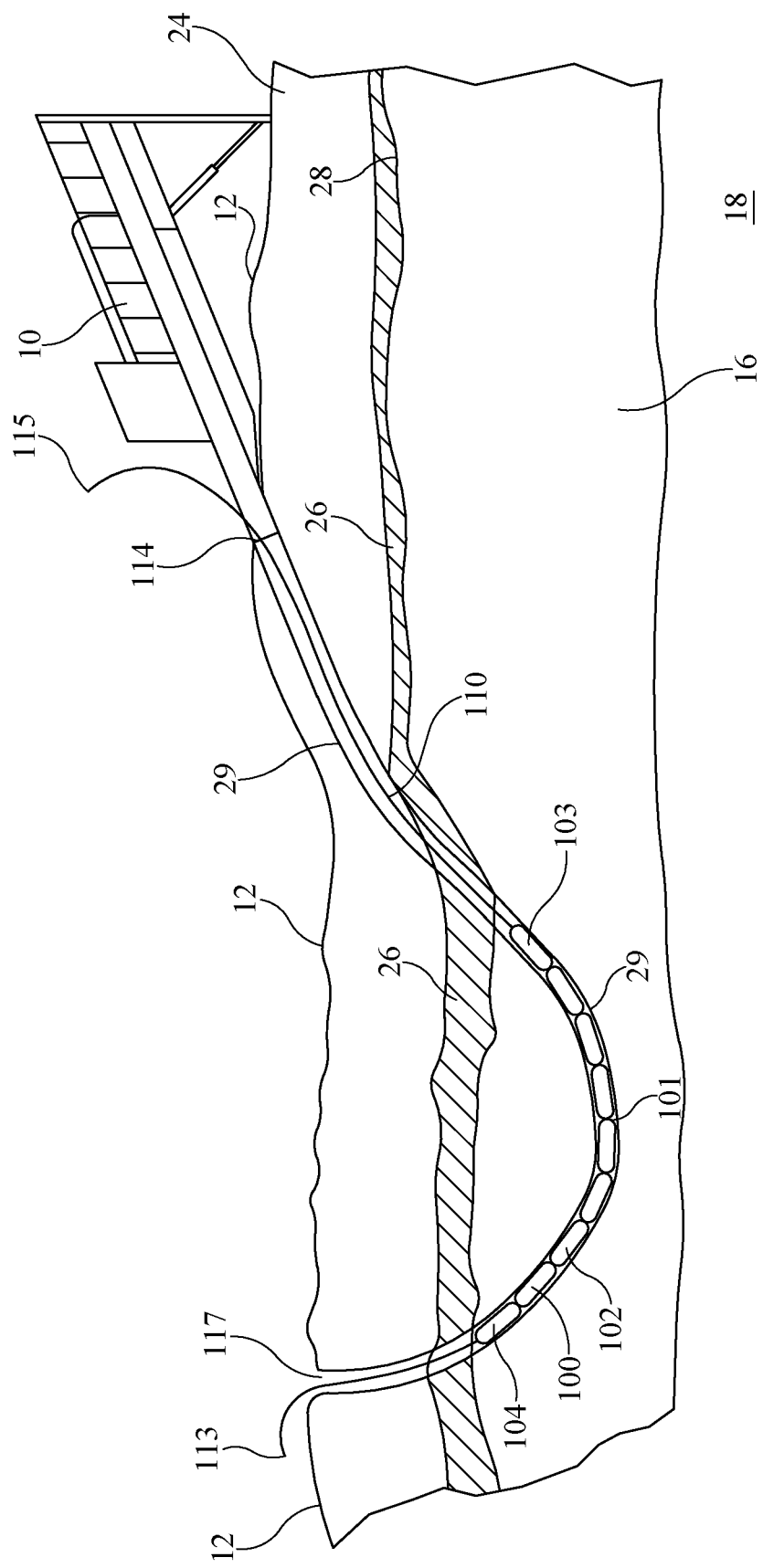
FIG. 1 is a cross-sectional schematic view of a string of reactant chambers of the present disclosure installed in an aquifer to be treated.

The present invention provides a string of reactant chambers and a process thereof.

In at least one aspect of the present disclosure, a string of reactant chambers is provided. The string of reactant chambers may be configured for inserting into a curved or nonlinear well. For example, each reactant chamber in the string of reactant chambers may be coupled together wherein each adjacent reactant chamber may pivot about their coupled ends. This configuration to pivot may allow the string to be inserted into a curved or nonlinear well. The length of each reactant chamber may be dependent upon the outer perimeter of the reactant chamber, the inner diameter of the well, and the arc of a curve in the well or abruptness deviation from linear in the well.

In at least one other aspect of the present disclosure, each reactant chamber, in a string of reactant chambers, is configured to be filled or recharged while remaining in the string of reactant chambers. For example, a string of reactant chambers may be extracted from the well by pulling a cord attached to each reactant chamber in the string. The string may be pulled from the well head or a remote exit, such as a pit. Upon extracting a reactant chamber from the well it may be charged, or recharged, by removing an end cap and filling the reactant chamber with reactant. The reactant chambers may be configured to have an end cap removed while the reactant chamber remains a part of the string of reactant chambers.

A variety of drilling methods may be used to create a borehole, for example, percussion drilling, rotary drilling, directional boring, directional drilling, horizontal directional drilling (HDD), or direct push, with a Geoprobe™, for example, may provide for advantageous installation of a well or borehole. A directional drill may be suitable for a variety of soil conditions and jobs. A directional drill may be used to install a string of reactant chambers under a road or structure. Directional boring, or horizontal directional drilling, HDD, is a steerable trenchless method of making a borehole. Directional drilling is commonly used for the installation of underground pipes, conduits and cables. Typically, the borehole is in the form of a shallow arc proximate a prescribed bore path. A surface launched drilling rig, with minimal impact on the surrounding area, may be used. For example, horizontal directional drills manufactured by Vermeer of Pella, Iowa, and directional drills manufactured by DitchWitch® of Perry, Okla., may be used for the installation of the string of reactants presently disclosed. Some examples of drilling, which may be used or adapted for use in at least one possible embodiment of the present disclosure, may be found in U.S. Patent: U.S. Pat. No. 9,061,333 to Swearingen et al., entitled "PROCESS FOR INSITU TREATMENT OF SOIL AND GROUNDWATER", incorporated herein in its entirety.

The directional control capabilities of directional drilling may provide for making changes in the directions of the drilling head. For example, a pilot borehole may be made by starting perpendicular to the surface, at 45° with the surface, at 30° with the surface, or at another desired angle with the surface, and curved or arced to a desired angle. The borehole may terminate in the ground or may have an exit remote from the well head. For example, a well may exit into an access pit.

In at least one embodiment of the present disclosure, a string of reactant chambers are configured to be inserted and withdrawn from a curved or arced borehole. Additionally, in at least one embodiment of the present disclosure, no access pit is required for inserting or withdrawing a string of reactant chambers into, or out of, the well. In another aspect of the present disclosure, the well may have an exit remote from the well head which may exit into an access pit and the string of reactant chambers may be pulled from the well exit.

Upon drilling the borehole, a flow through casing may be placed or inserted into the well. The casing, tube, or pipe may be porous or otherwise permeable, such as tubing or pipe having perforations, slots, or other openings therein configured to provide the flow of water through the side of the tubes or pipes. The tubes or pipes may be comprised of materials such as PVC, HDPE, polyethylene, ductile iron, copper, and steel. Advantageously, the tubes or pipes may be flexible, bendable or malleable so that they may be inserted into a curved or nonlinear borehole.

A reactant chamber, or string of reactant chambers, may hold a reactant and may be inserted into the casing. The string of reactant chambers may be pulled or pushed into the borehole. In at least one embodiment of the present disclosure, lengths of porous tubing are joined together and fed into the borehole. For example, lengths of porous tubing packed with at least one solid reactant may be provided to aid in installation. The lengths of tubing may be flexible joined or coupled. The lengths of tubing may have one or both ends threaded for screwing on an end cap.

In at least one aspect of the present disclosure, the reactant chamber has a flow through sidewall which may be screened, slotted, or otherwise porous and may be pre-engineered with the correct well screen size to hold a reactant therein. For example, the reactant chambers of the present disclosure may be configured to house a solid reactant. The solid reactant may comprise an oxidant or oxidants, a reductant or reductants, one or more reactive materials selected from the group consisting of peroxides, permanganates, persulfates, hypochlorite solutions, ozone, zero valent iron, fluorine, sodium bisulfate, metabisulfide, polysulfide, and any combination thereof. The solid reactant may comprise reactive materials comprising particles substantially encapsulated with an encapsulant. For example, the encapsulated reactant disclosed in U.S. Pat. No. 7,431, 849, to Swearingen et al., incorporated herein by reference. The encapsulant or encapsulate may have a characteristic selected from the group consisting of substantially oleophilic, hydrophobic, siliphilic, hydrocarbon soluble, and combinations thereof. Zero valent iron is a reductant which may function to remove chlorinated organic contaminants from the subsurface aquifer by reductively de-chlorinating these species as contaminated groundwater, in the plume.

Zero valent iron may be effective for remediating other halogenated organic contaminants as well. Additionally, zero valent iron may be effective in remediating heavy metals in groundwater.

FIG. 1 shows a cross-sectional schematic view of a string of reactant chambers 101 of the present disclosure installed in an aquifer 16 to be treated. Specifically, FIG. 1 shows directional drill rig 10 and a borehole 29. Directional drill rig 10 is positioned upon soil surface 12 at a desired angle of incidence of a drill head. Directly below soil surface 12 is a vadose zone 24, which is an unsaturated zone extending from soil surface 12 to aquifer 16. Between aquifer 16 and vadose zone 24 may be a partially saturated zone 26 that may become substantially saturated from the rising and lowering of the water table or aquifer 16 and/or through capillary action.

Borehole 29 may be vertical, horizontal, curved or non-linear, or linear. In the example shown in FIG. 1, borehole 29 is curved and has an exit 117, which may comprise a pit. Borehole 29 has a portion extending into or through aquifer 16. A plurality of boreholes 29 may be drilled. For example, a plurality of boreholes 29 may be drilled into a plane substantially perpendicular to the direction of movement of a contaminant. For example, a plurality of boreholes 29 may be made to form a permeable reactive barrier, PRB. One or more boreholes 29 may be drilled through well head 114.

Drilling may commence at well head 114 and may be continued at an angle proximate to an angle of entry until the borehole becomes proximate a contamination, or contamination plume, where it may change directions, level off, or arc. Borehole 29 may change direction to become substantially parallel to surface 28 of aquifer 16. The zone designated as 18 is below the area of aquifer 16 to be treated with the example shown in FIG. 1. Zone 18 may be bedrock, an area of aquifer 16 having a lower flow rate, an area of aquifer 16 having a low concentration of contamination, or an area of aquifer 16 that may not be treated.

Upon becoming proximate the plume of contamination to be treated, the borehole 29 may be substantially leveled off to make a portion longitudinally extending substantially parallel with an upper surface 28 of the groundwater plume. In at least one embodiment, a plurality of boreholes 29 may be formed by drilling through a common well head 114. For example, a first borehole 29 may be made and the drill head may be retracted above the area to be treated. A second borehole may then arc away from the initial borehole, proximate well head 114. This process may be repeated until a desired configuration of boreholes 29 is made. For example, a PRB, horizontally or vertically extending, may be obtained. For instance, a plurality of boreholes 29 may be made to be proximate, vertically, or horizontally aligned to form a reactive barrier. It is to be understood that the present disclosure is not to be limited by any configuration of boreholes as the presently disclosed reactant chambers and process may be used in conjunction with most any borehole configuration.

Upon drilling one or more boreholes 29, a string of reactant chambers 101 may be placed into, or withdrawn from, a well or borehole 29. String of reactant chambers 101 may have a first reactant chamber 100 and a second reactant chamber 102, each of the reactant chambers may be configured to hold a reactant therein and have a flow through sidewall. Each reactant chamber may be configured for a 360° pivot with respect to an adjacent reactant chamber in the string of reactant chambers 101. For example, first reactant chamber 100 may be configured to pivot with respect to second reactant chamber 102.

An initial reactant chamber 103 may be proximate well head 114 and a final reactant chamber 104 may be proximate a terminal end of borehole 29 or exit 117. Cord 110 may have a length 113 after final reactant chamber 104, in the example where borehole 29 does not have a terminal end. Cord 110 may have a length, 115, before the initial reactant chamber 103. The cord length before the initial reactant chamber, 115, may enable string of reactant chambers 101 to be pulled out through well head 114. The cord length after the final reactant chamber, 113, may enable string of reactant chambers 101 to be pulled out through well exit 117.

FIG. 2a shows an exploded view of reactant chamber 100 of the present disclosure. Reactant chamber 100 may comprise a flow through sidewall 120 with a first and second axial end. A first end cap 130 may be disposed on the first axial end and a second end cap 134 may be disposed on the second axial end, of flow through sidewall 120. End caps 130 and 134 may be configured to hold a reactant within reactant chamber 100. A first coupler 132 extends from the first end cap 130 and a second coupler 136 extends from the second end cap 134. First coupler 132 may be configured to couple and uncouple with a second coupler, for example a second coupler 136, on an adjacent reactant chamber in a string of reactant chambers. First coupler 132 and second coupler 136 may be configured for a 360° pivot of adjacent reactant chambers in a string of reactant chambers. For example, the coupled string of reactant chambers may be placed into and withdrawn from a curved well.

First end cap 130 on first reactant chamber 100 may be configured to be removed from its first flow through sidewall 120, upon first coupler 132 on the first reactant 100 chamber being uncoupled from second coupler 136 on an adjacent second reactant chamber 102. In this respect, the string of reactant chambers 101 may be configured to remain in a joined string upon uncoupling and removal of first end cap 130 from first flow through sidewall 120. This may allow a string of reactant chambers to be withdrawn from a well and recharged, without separating the reactant chambers from the string of reactant chambers.

In at least embodiment of the present disclosure, reactant chamber 100 has flow through sidewall 120. Flow through side 120 may be permeable or have slots or perforations 122. Flow through sidewall 120 may have beveled portions 124 configured and disposed for placement of straps or clamps there around. Helical thread 126 may be on an end of flow through sidewall 120 configured to cooperate with helical thread 128 on first end cap 130. In this example, first end cap 130 may be screwed onto, or off of, flow through sidewall 120. First end cap 130 may have first coupler 132 extending therefrom. Second end cap 134 may have second coupler 136 extending therefrom. Second end cap 134 may, or may not, be removable from flow through sidewall 120. For example, second end cap 134 may be unitary with, or an extension of, flow through sidewall 120.

FIG. 2b shows an exploded view of reactant chamber 200 of the present disclosure. Reactant chamber 200 may comprise a flow through sidewall 220 with a first and second axial end. A first end cap 230 may be disposed on the first axial end and a second end cap 234 may be disposed on the second axial end, of flow through sidewall 220. End caps 230 and 234 may be configured to hold a reactant within reactant chamber 200. A first coupler 232 extends from the first end cap 230 and a second coupler 236 extends from the second end cap 234. First coupler 232 may be configured to couple and uncouple with a second coupler, for example a second coupler 236 or 136, on an adjacent reactant chamber in a string of reactant chambers.

First coupler 232 and second coupler 236 may be configured for a 360° pivot of adjacent reactant chambers in a string of reactant chambers. For example, the coupled string of reactant chambers may be placed into and withdrawn from a curved well.

First end cap 230 on first reactant chamber 200 may be configured to be removed from its first flow through sidewall 220, upon first coupler 232 on the first reactant 200 chamber being uncoupled from second coupler 236, or 136, on an adjacent second reactant chamber. In this respect, the string of reactant chambers 101 may be configured to remain in a joined string upon uncoupling and removal of first end cap 230, and/or second end cap 234, from first flow through sidewall 220. This may allow a string of reactant chambers to be withdrawn from a well and recharged, without separating the reactant chambers from the string of reactant chambers.

In at least embodiment of the present disclosure, reactant chamber 200 has flow through sidewall 220. Flow through side 220 may be permeable or have slots or perforations 222. Flow through sidewall 220 may have beveled portions 224 configured and disposed for placement of straps or clamps there around. A removable end cap 234 may have a beveled portion 224. In at an embodiment where end cap 234 is to be removed from flow through sidewall 220, no strap or clamp may be placed around its beveled portion or it may be void of beveled portion 224.

Helical thread 226 may be on an end of flow through sidewall 220 configured to cooperate with helical thread 228 on first end cap 230. In this example, first end cap 230 may be screwed onto, or off of, flow through sidewall 220. First end cap 230 may have first coupler 232 extending therefrom.

Helical thread 227 may be on the other end of flow through sidewall 220 configured to cooperate with helical thread 229 on second end cap 234. In this example, second end cap 234 may be screwed onto, or off of, flow through sidewall 220. Second end cap 234 may have second coupler 236 extending therefrom.

In at least one embodiment of the present disclosure, a removable end cap, 130 or 230 for example, has a coupler in the form of an open eye hook, 132 or 232 for example, or other configuration that permits a cord to be removably held therewith. Non-removable end caps, 134 for example, may non-removably hold one or more cords with its coupler and may be a closed eye hook, coupler 136 for example. It is to be understood that couplers of other configurations as are known in the art may be disposed with the end caps.

Figure 3:
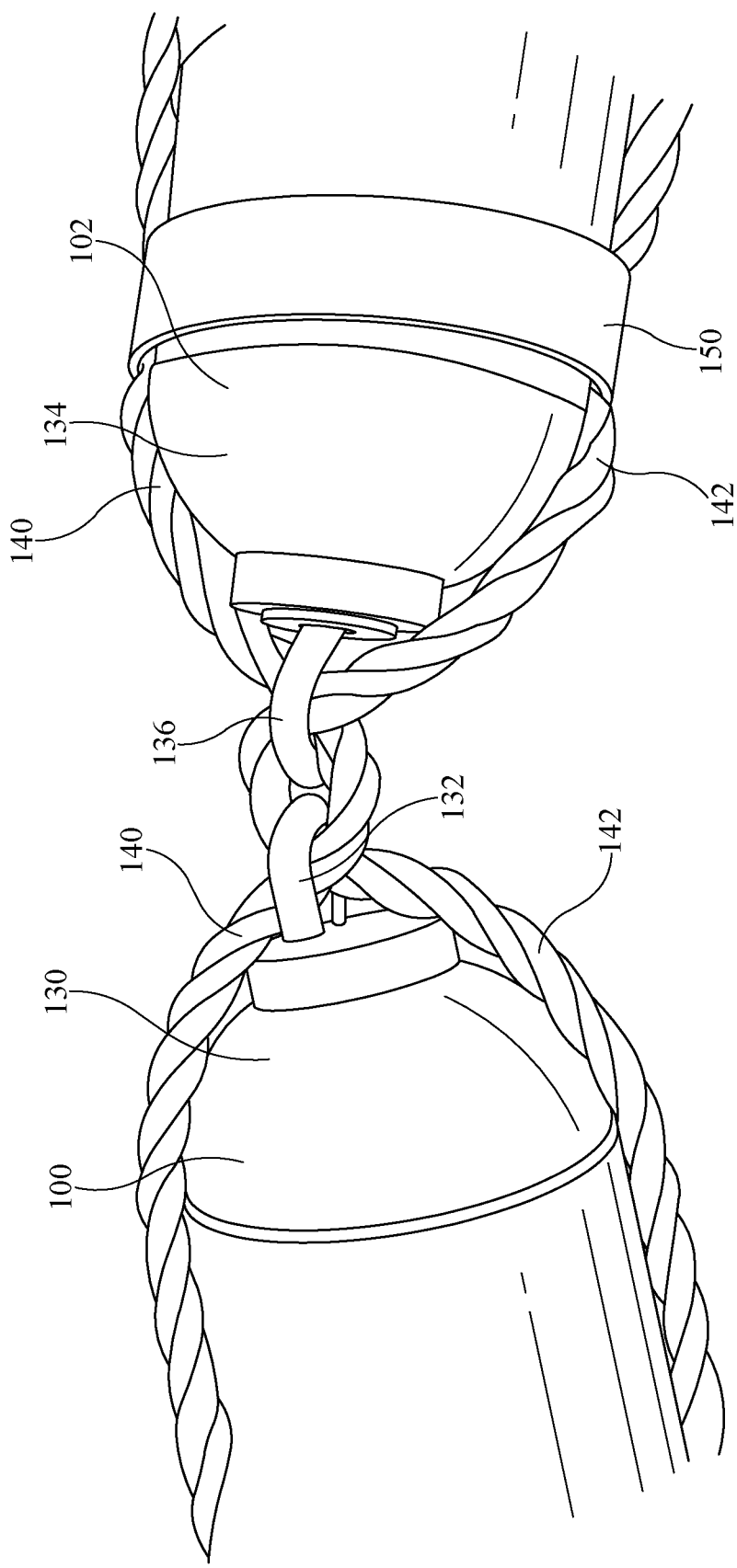
FIG. 3 shows a first reactant chamber coupled with a second reactant chamber.

FIG. 3 shows first reactant chamber 100 coupled with second reactant chamber 102. First reactant chamber 100 has first end cap 130 on a first axial end with first coupler 132 extending therefrom. Second reactant chamber 102 has second end cap 134 on a second axial end with second coupler 136 extending therefrom. Coupler 132 may be configured for coupling and uncoupling, with or from, coupler 136. For example, coupler 132 may have an open eye configuration, or other configuration, for removably holding cord 140 and/or cord 142.

In this example of coupling two reactant chambers, cords 140 and 142 extend along the sidewalls of reactant chambers 100 and 102. Cords 140 and 142 may be held to the reactant chambers with bands or clamps 150 which may be disposed around beveled portions 224. Reactant chambers 100 and 102 may be uncoupled by removing cords 140 and 142 from coupler 132 by sliding them out an opening in an open eye coupler 132. Upon uncoupling couplers 132 and 136, end cap 130 may be removed from reactant chamber 100.

For example, a string of reactant chambers may be configured to remain in a joined string upon uncoupling and removal of first end cap 130 from first flow through sidewall 120. A string of reactant chambers 100 may each have a first coupler with an open eye hook configuration. Second coupler 136 may be an open or closed eye hook, or have other configurations for holding cords 140 and/or 142. A string of reactant chambers 100 may comprise at least one cord, 140, 142, or both, secured to the flow through sidewall of the first reactant chamber 100 and to the flow through sidewall of the second reactant chamber 102. The at least one cord may be configured to couple and uncouple first coupler 132 of the first reactant chamber 100 to and from the second coupler 136 of second reactant chamber 102. The at least one cord, 140, 142, or both, may be configured to hold the first reactant chamber to the second reactant chamber, in a string of reactant chambers. The at least one cord may be secured to second end cap 134 of the second reactant chamber 102, as is shown with band 150.

In the example shown in FIG. 3, a string of reactant chambers, having adjacent reactant chambers 100 and 102 adjacently coupled, has 2 cords 140 and 142. Cords 140 and 142 may each be secured proximate opposite sides of the flow through sidewalls of first reactant chamber 100 and extending and secured proximate opposite sides of the flow through sidewall of second reactant chamber 102. The string of reactant chambers may comprise at least one band 150 wrapped around the flow through sidewall of first reactant chamber 100 and at least one cord 140 and/or 142, securing the at least one cord to the flow through sidewall of first reactant chamber 100. At least one band 150 may be wrapped around second end cap 134 of second reactant chamber 102 and the at least one cord 140 and/or 142, securing the at least one cord to end cap 134 of second reactant chamber 102. It is to be understood that first and second end caps, 130 and 134, may be void of a band 150, and that one end cap need not be removable from its sidewall.

Figure 4:
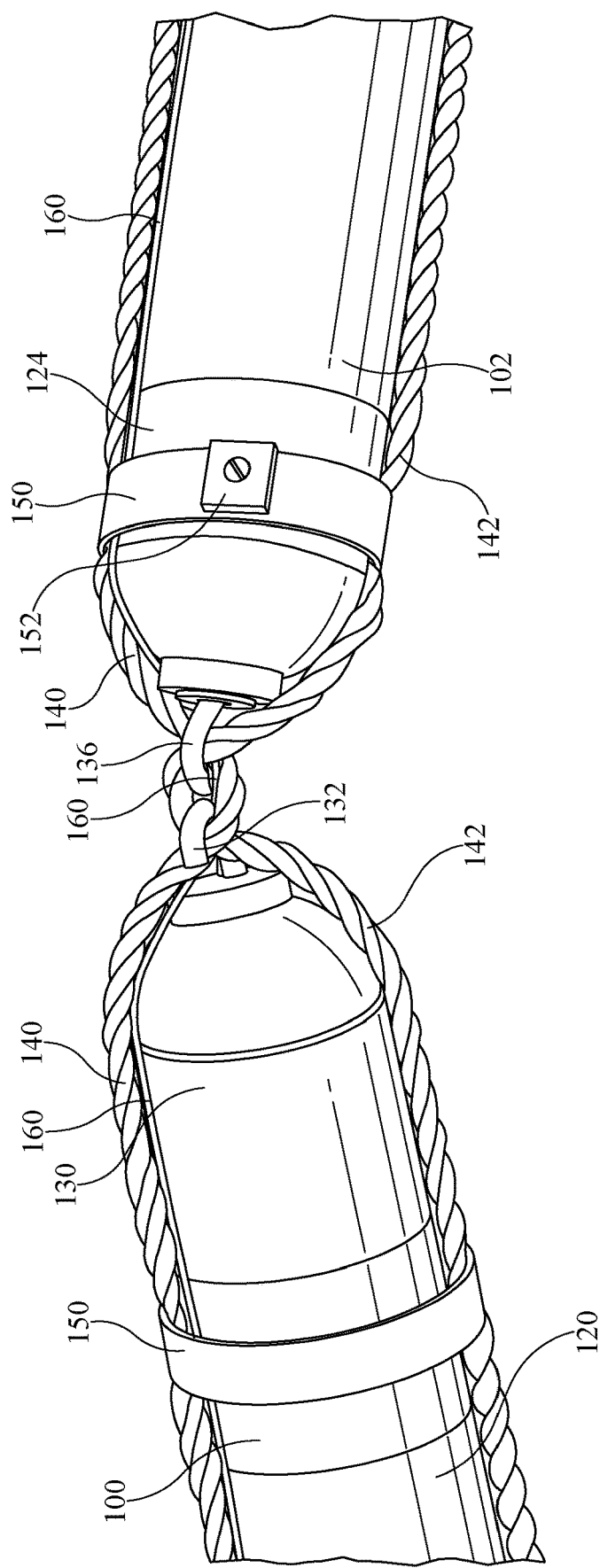
FIG. 4 shows a first reactant chamber coupled with a second reactant chamber and a coupling system having a reinforcing cord.

FIG. 4 shows a portion of first reactant chamber 100 adjacent to second reactant chamber 102 and a coupling system. A string of reactant chambers may have first reactant chamber 100 and second reactant chamber 102, each being configured for inserting a reactant therein, while maintaining the reactant chamber being filled in the string of reactant chambers. The string of reactant chambers may comprise a system configured to maintain a reactant chamber being filled in the string of reactant chambers. The system may comprise a first removable end cap 130 on each reactant chamber and a coupler on each reactant chamber. Each coupler may be configured to couple each reactant chamber together in a first and a second coupled configuration. For example, a first coupled configuration may have cords 140 and 142 extending along, and attached to, the sidewalls of reactant chambers 100 and 102. Cords 140 and 142 may be attached to the sidewalls with bands 150 which may have a tightener or crimp 152. Cords 140 and 142 may extend through couplers 132 and 136. Since cords 140 and 142 are bendable, each coupler is configured for a 360° pivot of first reactant chamber 100 with respect to the second reactant chamber 102, when the first and second reactant chambers are in the first coupled configuration.

A second coupled configuration may be obtained by removing cords 140 and 142 from coupler 132. This may be done by sliding cords 140 and 142 through an opening in couple 132. In this second coupled configuration, cords 140 and 142 extend along, and are attached to, the sidewalls of reactant chambers 100 and 102. In the second coupled configuration, first removable end cap 130 may be removed from first reactant chamber, while in the second coupled configuration. A reactant may then be placed into reactant chamber 100, while maintaining the reactant chambers in the string.

A reinforcing cord 160 may also be included with the coupling system of the present disclosure. Reinforcing cord 160 may extend through one or both couplers 132 and 136. Reinforcing cord 160 may provide resistance to overlap of couplers 132 and 136 when pushing a string of reactant chambers, thus mitigating bunching or jamming within a borehole. For example, reinforcing cord 160 may be desired when pushing a string of reactant chambers up inclined portion of a borehole and/or when cords 140 and 142 do not provide a desired resistance to overlap of couplers 132 and 136. Reinforcing cord 160 may have strength sufficient for mitigating overlap of first coupler 132 of the first reactant chamber 100 with the second coupler 136 of second reactant chamber 102 upon pushing the string of reactant chambers into a well. Reinforcing cord 160 may secured to the flow through sidewalls of the reactant chambers and may be configured cooperate and un-cooperate with first coupler 132.

Figure 5:
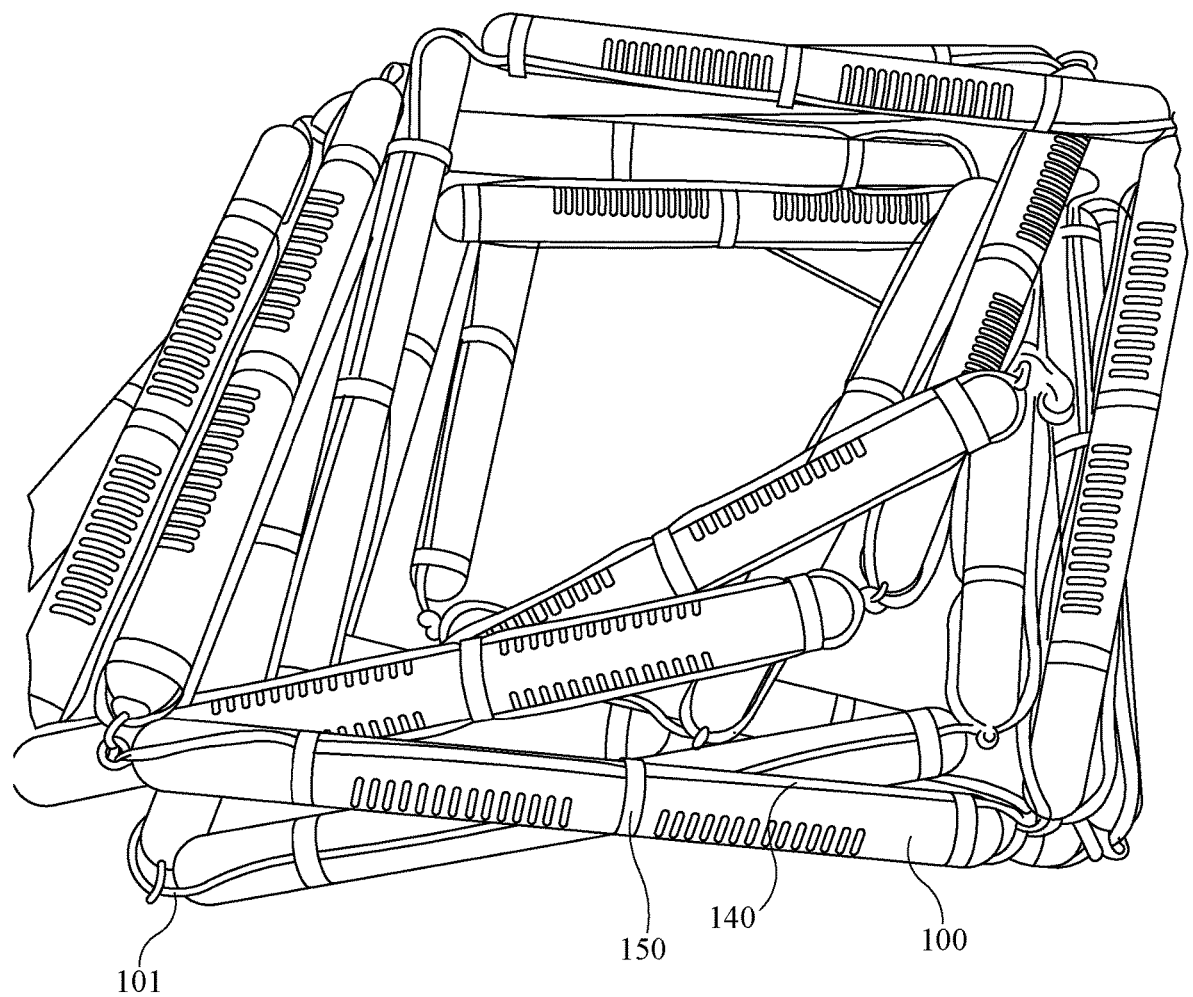
FIG. 5 shows a coupled string of reactant chambers of the present disclosure.

FIG. 5 shows a coupled string of reactant chambers 100 of the present disclosure. A plurality of reactant chambers 100 are coupled together in a string, 101, for inserting into a well. For example, each reactant chamber may be in the first coupled configuration having the removable end caps attached to the sidewalls and at least one cord 140 extending the length of the string.

Figure 6:
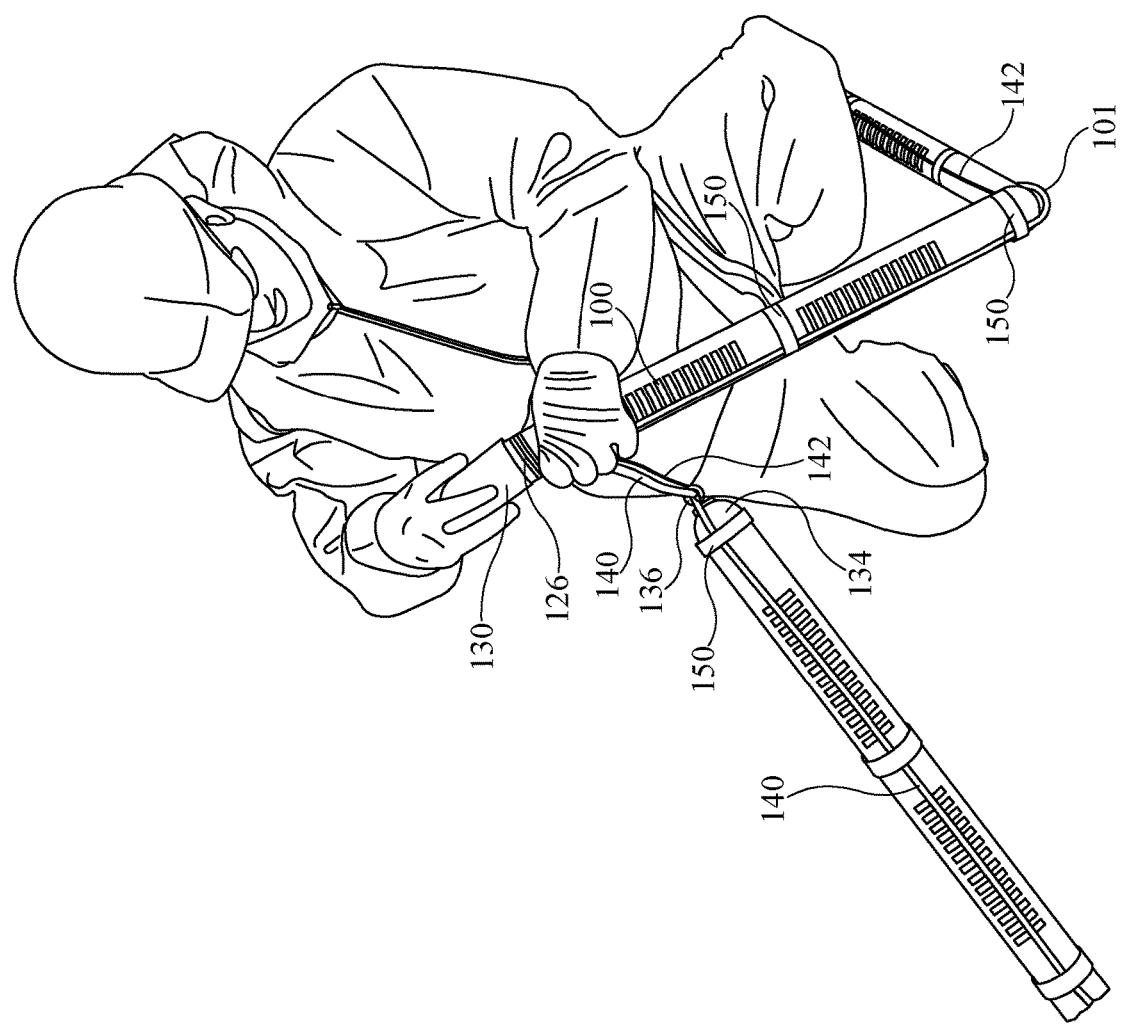
FIG. 6 shows a string of reactant chambers of the present disclosure wherein one reactant chamber is being filled or recharged with a reactant.

FIG. 6 shows a string 101 of reactant chambers 100 of the present disclosure wherein one reactant chamber is in the second coupled configuration and is being filled or recharged with a reactant. Cords 140 and 142 have been removed from a first coupler 132, and the first end cap 130, having the first coupler 132, has been removed from reactant chamber 100. As shown in FIG. 6, the reactant chamber 100 is maintained in the string of reactant chambers upon its end cap 132 being removed.

Figure 7:
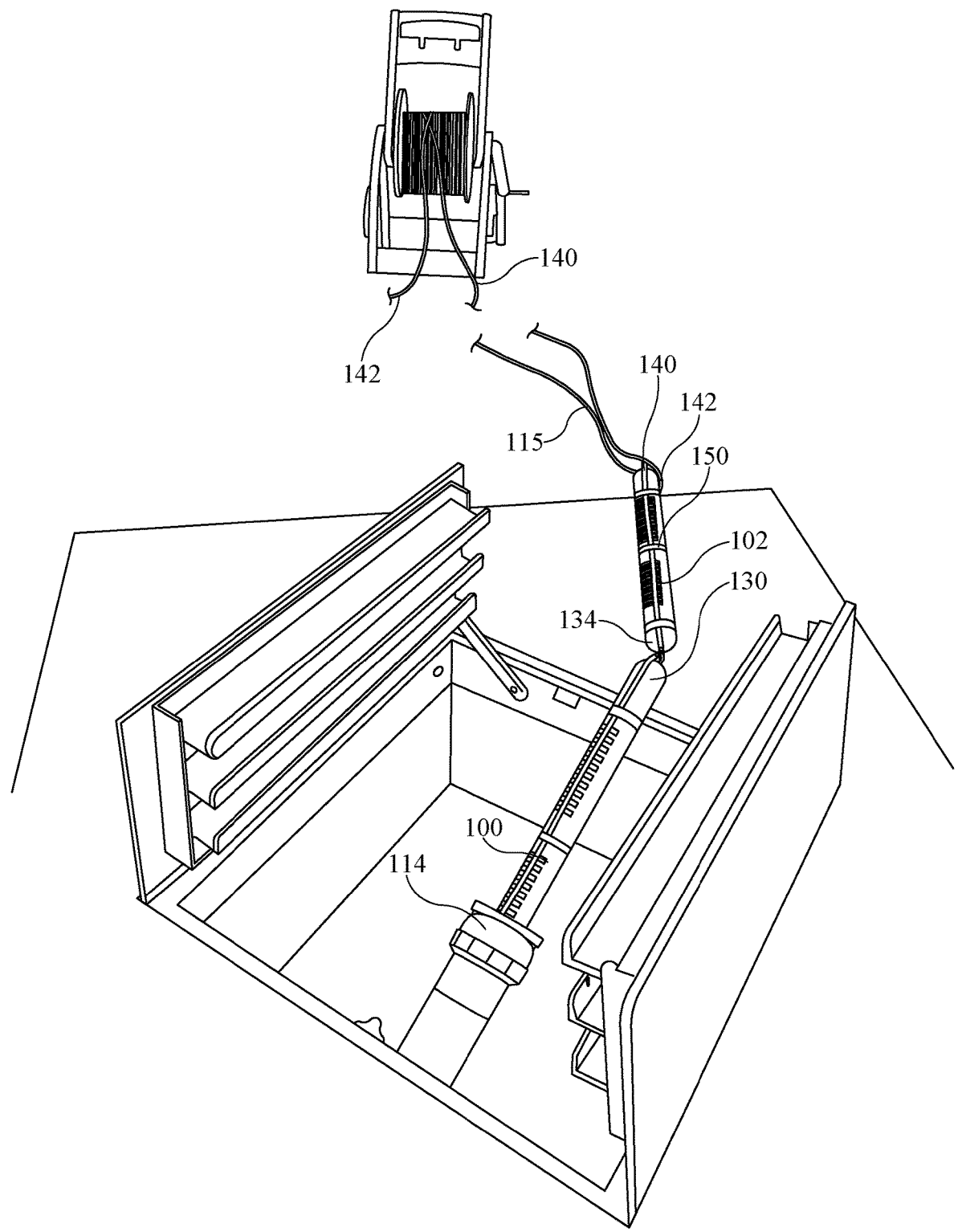
FIG. 7 shows a coupled string of reactant chambers of the present disclosure being fed into a well.

FIG. 7 shows a coupled string of reactant chambers of the present disclosure being fed into a well. The string of reactant chambers comprises a plurality of coupled reactant chambers 100, comprising at least a first reactant chamber 100 and second reactant chamber 102. The string of reactant chambers may be lowered, pushed, or pulled, into well head 114. For example, the borehole may have an exit and a length of cord 140 may be fed out the exit for pulling the reactant chamber string. The string of reactant chambers may have cord 140 with a length extending beyond an initial reactant chamber, 115, sufficient for placing the string of reactant chambers in a desired position within the well, through well head 114. The string of reactant chambers may have a cord 140 with a length extending beyond a final reactant chamber sufficient for pulling the string of reactant chambers out of the well through a well exit, remote from well head 114.

Some examples of permeable reactive barriers, which may be used or adapted for use in at least one possible embodiment of the present disclosure, may be found in the following U.S. Patents: U.S. Pat. No. 6,254,786 to Carpenter et al., U.S. Pat. No. 6,428,695 to Naftz et al., and U.S. Pat. No. 7,217,755 to Harrup, Mason K.

Some examples of reactants, which may be used or adapted for use in at least one possible embodiment of the present disclosure, may be found in the following U.S. Patents and Publications: US20080275288 to Swearengin et al., U.S. Pat. No. 7,431,849 to Swearengin et al., and US20090061082 to Swearengin et al.

The purpose of incorporating U.S. patents, foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

NOMENCLATURE drill rig 10
soil surface 12
aquifer 16
below area to be treated 18
vadose zone 24
partially saturated zone 26
upper surface of the groundwater plume 28
borehole 29
first reactant chamber 100
string of reactant chambers 101
second reactant chamber 102
initial reactant chamber 103
final reactant chamber 104
cord 110
cord length after final reactant chamber 113
well head 114
cord length before the initial reactant chamber 115
well exit 117
sidewall 120
slots or perforations 122
beveled portion of sidewall 124
helical thread on sidewall 126
helical thread on first end cap 128
first end cap 130
first coupler 132
second end cap 134
second coupler 136
cord 140
cord 142
band 150
band tighter or retainer 152
reinforcing cord 160
reactant chamber 200
sidewall 220
slots or perforations 222
beveled portion of sidewall 224
helical thread on sidewall 226
helical thread on sidewall 227
helical thread on first end cap 228
helical thread on second end cap 229
first end cap 230
first coupler 232
second end cap 234
second coupler 232

The invention claimed is:

1. A string of reactant chambers configured to be placed into and withdrawn from a well, the string of reactant chambers comprising:
    a first reactant chamber configured to hold a reactant therein, the first reactant chamber comprising:
        a flow through sidewall, a first axial end, and a second axial end;
    a second reactant chamber configured to hold a reactant therein, the second reactant chamber comprising:
        a flow through sidewall, a first axial end, and a second axial end; and
    a first coupler extending from the second axial end of the first reactant chamber configured to couple with a second coupler extending from the first axial end of the second reactant chamber and form the string of reactant chambers.

2. The string of reactant chambers of claim 1 comprising a cord extending from the first axial end of the first reactant chamber, the cord being configured to place the string of reactant chambers into the well and to withdraw the string of reactant chambers from the well.

3. The string of reactant chambers of claim 2, wherein the cord extends to the second reactant chamber.

4. The string of reactant chambers of claim 3, wherein the coupler comprises the cord.

5. The string of reactant chambers of claim 1, wherein the coupler is configured to uncouple the second axial end of the first reactant chamber from the first axial end of the second reactant chamber.

6. The string of reactant chambers of claim 1, wherein at least one of the first axial end and the second axial end, of the first reactant chamber, comprises a removable end cap and at least one of the first axial end and the second axial end, of the second reactant chamber, comprises a removable end cap.

7. The string of reactant chambers of claim 6, wherein at least one of the removable end caps is configured to cooperate with the coupler.

8. The string of reactant chambers of claim 6, wherein at least one of the removable end caps is configured to cooperate with the coupler and the string of reactant chambers is configured to remain in a joined string upon removal of the end cap configured to cooperate with the coupler.

9. The string of reactant chambers of claim 1, wherein coupler is configured for a 360° pivot of the first reactant chamber with respect to the second reactant chamber, configuring the string of reactant chambers to be placed into and withdrawn from a curved well.

10. A process of placing a string of reactant chambers into a well, the process comprising the steps of:
    adjacently coupling a second axial end of a first reactant chamber to a first axial end of a second reactant chamber;
    attaching a cord to a first axial end of the first reactant chamber;
    placing the coupled first reactant chamber and the second reactant chamber into the well; and
    lowering the coupled first reactant chamber and the second reactant chamber into the well by extending the cord into the well.

11. The process of placing a string of reactant chambers into a well of claim 10, wherein the step of coupling a first reactant chamber with a second reactant chamber comprises coupling a second axial end of the first reactant chamber with a first axial end of the second reactant chamber.

12. The process of placing a string of reactant chambers into a well of claim 10 further comprising a step of withdrawing the string of reactant chambers from the well, the withdrawing of the string of reactant chambers from the well being performed by withdrawing the cord from the well.

13. The process of placing a string of reactant chambers into a well of claim 12 further comprising a step of recharging at least one of the reactant chambers with at least one reactant, upon withdrawing the string of reactant chambers from the well.

14. The process of placing a string of reactant chambers into a well of claim 13, wherein the step of recharging at least one of the reactant chambers with at least one reactant comprises removing an end cap from an axial end of the at least one reactant chamber being recharged.

15. The process of placing a string of reactant chambers into a well of claim 14, wherein the step of removing an end cap from the at least one reactant chamber being recharged comprises maintaining the coupling of the first reactant chamber with the second reactant chamber.

16. The process of placing a string of reactant chambers into a well of claim 15 comprising:

a) uncoupling an end cap on the second reactant chamber from the first reactant chamber, in the string of reactant chambers;

b) removing the uncoupled end cap from the second reactant chamber and forming an opening in the second reactant chamber;

c) charging the second reactant chamber by inserting a reactant into the formed opening;

d) replacing the removed end cap back onto the second reactant chamber;

e) coupling the first reactant chamber to the second reactant chamber, in the string of reactant chambers; and f) maintaining the first reactant chamber in the string of reactant chambers while performing steps a)-e).

17. The process of placing a string of reactant chambers into a well of claim 10 comprising placing the string of reactant chambers into a curved well and the step of lowering the coupled first reactant chamber and the second reactant chamber into the well further comprises pivoting the first reactant chamber with respect to the second reactant chamber.

* * * * *